(12) United States Patent
Förster et al.

(10) Patent No.: US 10,557,512 B2
(45) Date of Patent: Feb. 11, 2020

(54) VIBRATION DAMPER AND VEHICLE

(71) Applicant: ZF Friedrichshafen AG, Friedrichshafen (DE)

(72) Inventors: Andreas Förster, Schweinfurt (DE); Achim Thomae, Bergrheinfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/678,496

(22) Filed: Aug. 16, 2017

(65) Prior Publication Data

US 2018/0058532 A1 Mar. 1, 2018

(30) Foreign Application Priority Data

Sep. 1, 2016 (DE) .................. 10 2016 216 546

(51) Int. Cl.
*F16F 9/348* (2006.01)
*F16F 9/32* (2006.01)
*F16F 9/512* (2006.01)
*B60G 13/08* (2006.01)

(52) U.S. Cl.
CPC ............ *F16F 9/325* (2013.01); *F16F 9/5126* (2013.01); *B60G 13/08* (2013.01); *B60G 2206/41* (2013.01); *F16F 2230/183* (2013.01); *F16F 2230/22* (2013.01)

(58) Field of Classification Search
CPC ...... F16F 9/18; F16F 9/34; F16F 9/185; F16F 9/5126
USPC .................. 188/266.5, 282.3, 282.5, 315
See application file for complete search history.

(56) References Cited

U.S. PATENT DOCUMENTS

| | | | | |
|---|---|---|---|---|
| 2,432,937 A | * | 12/1947 | Rossman ................ | F16F 9/185 188/315 |
| 2,714,942 A | * | 8/1955 | Funkhouser ............ | F16F 9/185 188/315 |
| 3,513,947 A | * | 5/1970 | Duckett .................. | F16F 9/185 188/269 |
| 4,936,423 A | * | 6/1990 | Karnopp ............ | B60G 17/0152 137/625.47 |
| 5,145,206 A | * | 9/1992 | Williams ........... | B60G 17/0152 188/266.2 |
| 5,205,581 A | * | 4/1993 | Kallenbach ............ | B60G 17/04 280/124.161 |
| 5,386,893 A | * | 2/1995 | Feigel ...................... | F16F 9/18 188/266.5 |
| 5,400,877 A | * | 3/1995 | Kircher ................. | F16F 9/3278 188/282.3 |
| 5,588,510 A | * | 12/1996 | Wilke ..................... | F16F 9/064 188/266.6 |

(Continued)

FOREIGN PATENT DOCUMENTS

| | | | |
|---|---|---|---|
| DE | 2323361 | * | 11/1974 |
| DE | 102005048949 | * | 12/2006 |

(Continued)

*Primary Examiner* — Christopher P Schwartz
(74) *Attorney, Agent, or Firm* — Cozen O'Connor

(57) ABSTRACT

A vibration damper for a motor vehicle with a hydraulic unit and at least one valve for controlling the volume flow to the hydraulic unit, wherein the at least one valve and the hydraulic unit are arranged outside of the tube elements of the vibration damper and a motor vehicle including such vibration damper.

17 Claims, 5 Drawing Sheets

(56) References Cited

U.S. PATENT DOCUMENTS

| | | | | |
|---|---|---|---|---|
| 5,611,413 | A * | 3/1997 | Feigel | F16F 9/46 |
| | | | | 188/266.5 |
| 5,682,980 | A * | 11/1997 | Reybrouck | B60G 17/04 |
| | | | | 280/124.16 |
| 6,755,113 | B2 * | 6/2004 | Shih | F15B 1/021 |
| | | | | 60/413 |
| 7,413,062 | B2 * | 8/2008 | Vandewal | B60G 17/0152 |
| | | | | 188/266.5 |
| 7,543,824 | B2 * | 6/2009 | Chapman | B60G 17/0408 |
| | | | | 280/5.514 |
| 7,699,147 | B2 * | 4/2010 | Preukschat | B60G 17/04 |
| | | | | 188/282.4 |
| 8,307,965 | B2 * | 11/2012 | Foster | F16F 9/516 |
| | | | | 188/281 |
| 8,820,064 | B2 * | 9/2014 | Six | B60G 17/056 |
| | | | | 60/414 |
| 8,839,920 | B2 * | 9/2014 | Anderson | B60G 13/14 |
| | | | | 188/322.21 |
| 9,481,221 | B2 * | 11/2016 | Reybrouck | B60G 15/08 |
| 9,702,424 | B2 * | 7/2017 | Zuckerman | B60G 17/056 |
| 9,879,744 | B2 * | 1/2018 | Haller | B60N 2/505 |
| 9,994,239 | B2 * | 6/2018 | Haller | B60N 2/505 |
| 2009/0260935 | A1 | 10/2009 | Avadhany | |
| 2013/0147205 | A1 | 6/2013 | Tucker | |
| 2014/0116243 | A1 * | 5/2014 | Six | B60G 17/056 |
| | | | | 91/418 |
| 2016/0215847 | A1 * | 7/2016 | Forster | F16F 9/5126 |
| 2016/0230830 | A1 * | 8/2016 | Haller | B60N 2/505 |
| 2017/0009841 | A1 * | 1/2017 | Forster | F16F 9/5126 |

FOREIGN PATENT DOCUMENTS

| | | |
|---|---|---|
| DE | 102009022328 | 6/2010 |
| WO | WO2010066416 | 6/2010 |
| WO | WO2014066469 | 5/2014 |

* cited by examiner

VIBRATION DAMPER AND VEHICLE

BACKGROUND OF THE INVENTION

1. Field of the Invention

The invention is directed to a vibration damper for a motor vehicle with a hydraulic unit and at least one valve for controlling the volume flow to the hydraulic unit.

2. Description of the Related Art

It is known to carry out a body control of the motor vehicle body by vibration dampers. By body control is meant an at least partial adjustment of, control of, or other action on the height of the vehicle body. Examples of this are the implementation of a roll compensation, pitch compensation or other leveling control of the vehicle body. This can be a temporary height compensation, for example, while driving over potholes or corrugations in road surfaces such as the roll compensation or pitch compensation described above, or medium-term height compensation such as compensation when cornering. Finally, there are also long-term height compensation scenarios, for example, during load compensation which is to take place for the entire journey.

Vibration dampers which usually have a hydraulic arrangement in the form of a hydraulic pump and by which the hydraulic medium can be moved selectively in the vibration damper are known for the implementation of body control. Vibration dampers of this type are known, for example, from US2009/0260935 A1, US2013/0147205 A1, DE 10 2009 022 328 A1 or WO 2014/066469 A1, the entire contents of which are hereby incorporated herein by reference.

The problem with some hydraulic pumps consists in protecting them from an excessively high volume flow. Accordingly, US2016/215847 A1, the entire content of which is hereby incorporated herein by reference, discloses a bottom valve for a twin-tube damper with intermediate wall in which a bypass path is provided between intermediate wall and working cylinder and in which the valve opens or closes the bypass path depending on the volume flow.

In view of the foregoing, it is an object of the present application to provide a vibration damper which is constructed in a simpler manner.

SUMMARY OF THE INVENTION

This object is met in a vibration damper of the type mentioned in the introductory part in that the at least one valve and the hydraulic unit are arranged outside of the vibration damper.

The core of the invention consists in that the bypass valve is no longer configured as a bottom valve as was previously customary in twin-tube vibration dampers with or without intermediate wall, but rather is arranged outside of the tube elements of the vibration damper. This makes it possible to simplify the construction of the vibration damper. In particular, the bypass path can be shortened considerably.

The at least one valve and the hydraulic unit can advantageously be arranged in a housing which is fastened to the vibration damper. In principle, it is possible to arrange the valve and the hydraulic unit anywhere in the vehicle. However, hose connections will then be necessary. Accordingly, it is particularly preferred that the housing accommodating the hydraulic unit and the at least one valve is fastened directly to the vibration damper so that no hose connections are necessary.

The hydraulic unit can advantageously be configured as a hydraulic pump. A hydraulic pump comprises a pump unit and a drive unit, usually in the form of an electric motor. This electric motor can be controlled so that a body control of the motor vehicle is possible at any time. In this regard, the electric motor may be sealed off from the hydraulic medium or fluid or can be located in the hydraulic medium.

The at least one valve can advantageously have a valve housing and a valve slide which is movable in the valve housing for at least partially closing at least one flow path of a fluid flowing through. Therefore, the valve or valves are preferably constructed as seat valves.

The valve can advantageously have an input side and an output side, and the pressure-impingement surface areas of the valve slide are substantially equally dimensioned for an opening pressure and a closing pressure, and the valve slide has a restriction via which a pressure difference between opening pressure and closing pressure can be generated. In particular, the valve can be made to close and open as a function of volume flow via the restriction.

In a particularly advantageous manner, at least one channel can connect the inside space of the valve slide with the outside space of the valve slide. In a further development of the valve described in US2016/215847 A1, a valve disclosed in US2017/009841 A1, the entire content of which is hereby incorporated herein by reference, has a similar appearance but operates hydraulically in a substantially different manner because of the channel. The functioning of the valve is described in the above-cited Laid Open Application.

A bypass path which can be closed by means of the valve slide can advantageously be fluidically connected as a flow path to the input side of the valve. It should be noted in this regard that the valve can only be opened in one direction and always remains in its basic position in the other direction regardless of the volume flow. The input side is the side of the valve remote of the hydraulic unit. This means that the input side is the side of the valve through which the fluid initially flows when it flows in the direction of the hydraulic unit. If the fluid flows away from the hydraulic unit through the valve, no volume flow control is necessary. Thus the considerations apply to the case in which the valve controls the volume flow of the fluid in direction toward the hydraulic unit.

Further, a main flow path which can be closed by the valve slide can be fluidically connected as a flow path to the output side of the valve. In a further development, the main flow path can also be only partially closed through the valve in the closing position so that a portion of the main flow path is always open.

The valve slide can advantageously be preloaded by an energy storage, particularly a spring. Accordingly, the valve has a defined basic position and initial position. In particular, the volume flow can accordingly be selectively adjusted for opening the bypass path and for partially or completely closing the main flow path.

The channel can advantageously connect the inside space of the valve slide to an annular space around the valve slide, particularly an annular space which accommodates a spring. The annular space around the valve slide then has a twofold function: on the one hand, it can receive the spring for preloading the valve slide and on the other hand can be a hydraulic pressure chamber at the same time.

The at least one channel can advantageously be arranged in the region of the restriction. At this location, the velocity of the fluid is highest, but the pressure of the fluid is lowest. In this way, a maximum opening pressure can be generated.

Advantageously, two valves can be provided for controlling the volume flow to the hydraulic unit, both of which valves are arranged outside of the tube elements of the vibration damper. Both valves are also arranged in the housing together with the hydraulic unit. Accordingly, the volume flow to the hydraulic unit can be controlled in pull direction as well as in push direction during the operation of the vibration damper.

The input sides of the valves can both preferably face toward a tube element of the vibration damper. Accordingly, one valve is provided for the pull direction and one valve is provided for the push direction so that only one volume flow that can be handled by the hydraulic unit is allowed through on the input sides of the valves. However, this also ensures at the same time that the second valve in the flow path through which the fluid proceeds from the output side can also handle this volume flow.

Accordingly, it is advantageously provided that the two valves open and close with substantially equal volume flow.

In a particularly advantageous manner, a bypass path which can be at least partially released through a valve can at least partially conform to the bypass path of the other valve. The bypass paths can at least partially overlap so that the two bypass valves can be housed directly next to one another in the housing. Beyond this, the bypass path can be drastically shortened in this way because there is only a short distance to be bridged between the sides of the valves.

The bypass paths can advantageously have a check valve at the output. The outputs of the bypass paths are not automatically alternately the inputs which begin at the end of each valve slide. When the one valve, namely the bypass path, opens because there is a volume flow that is too large, the other valve is necessarily closed because it can be preloaded by a spring in the closing position on the one hand and is also closed by the volume flow of fluid on the other hand. Therefore, the fluid entering the bypass path cannot escape via the input of the other bypass path because this other bypass path is closed. Rather, the fluid escapes via a second opening at the bypass path, which second opening connects the bypass path to the input side of the other valve.

The check valves close the bypass path provided that the fluid flows proceeding from the tube elements of the vibration damper. Conversely, if the fluid from the bypass path presses on the check valve, this check valve opens and allows the fluid to escape from the bypass path.

At least one check valve can advantageously be formed as a corrugated or wave spring. It has turned out that a corrugated spring is especially suited to close and release a plurality of annularly arranged openings of the bypass path simultaneously and can also be produced very inexpensively.

The vibration damper can preferably have a working cylinder and a reservoir tube surrounding the latter. In a particularly preferable manner, the vibration damper has, as tube elements, exclusively a working cylinder and a reservoir cylinder surrounding the latter. The great advantage of the arrangement of the valves or valve outside of the tube elements of the vibration damper consists in that the bypass path accordingly also lies outside of the tube elements of the vibration damper and, therefore, the intermediate tube can be omitted. This makes the vibration damper simpler to build and more economical to produce.

A dividing ring can advantageously divide the annular space between working cylinder and reservoir tube into two partial spaces. The dividing ring is preferably arranged between two openings which lie outside of the tube elements of the vibration damper relative to the valves.

In addition, the invention is directed to a motor vehicle with a vibration damper. It is characterized in that the vibration damper is constructed in the manner described above.

BRIEF DESCRIPTION OF THE DRAWINGS

Further advantages, features and details of the invention follow from the embodiments described in the following in connection with the drawings in which.

DETAILED DESCRIPTION OF THE PRESENTLY PREFERRED EMBODIMENTS

Figure 1:
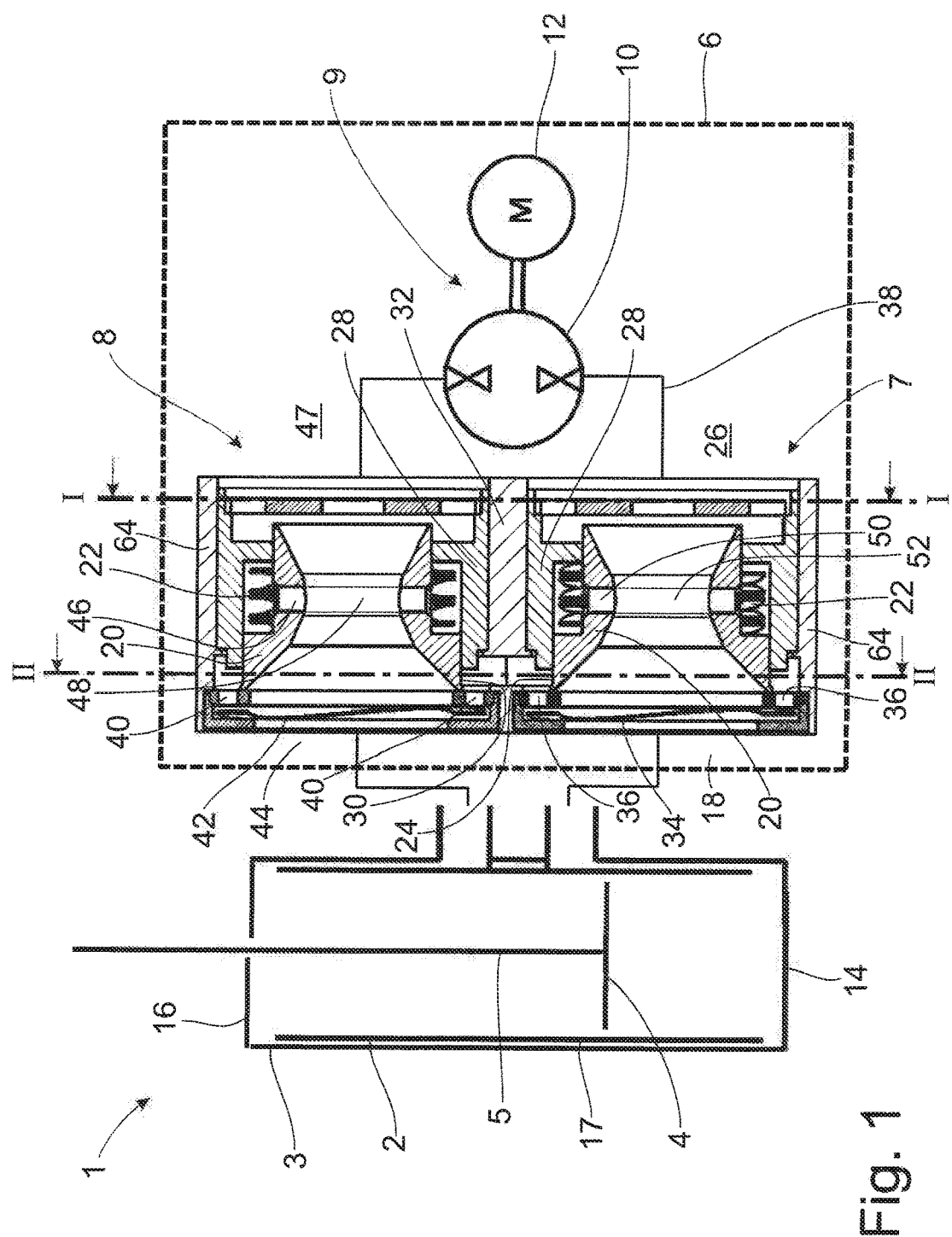
FIG. 1 is a schematic view of a vibration damper with a cross-sectional view of the valves of the present invention.

FIG. 1 shows a vibration damper 1 with a working cylinder 2, a reservoir tube 3, a piston 4, a piston rod 5 and a housing 6. Two valves 7 and 8 and the hydraulic unit 9 are arranged in the housing 6. The valves 7 and 8 are valves for controlling the volume flow to the hydraulic unit 9. Additional valves can be provided in the vibration damper 1, for example, in or at the piston 4, as pressure-limiting valves and for adjusting the damping force of the vibration damper 1.

The hydraulic unit 9 comprises a pump 10 and an electric motor 12. Electric motors which can also work in hydraulic fluid are known. Accordingly, it is not compulsory to seal the electric motor 12 from the pump 10, but it may be necessary.

A push direction and a pull direction will be determined in the following to explain the manner of functioning of the valves. However, it must be taken into account that the arrangement in the housing 6 is constructed symmetrically with respect to the pull direction and push direction, i.e., that it is not important in and of itself through which of the valves 7 or 8 or in which direction flow initially takes place.

The direction in which piston 5 moves toward the bottom 14 of the working cylinder 2 is designated as push direction. The pull direction is that in which the piston 4 moves toward the piston rod guide 16.

In push direction, the hydraulic fluid of the vibration damper 1 flows out of the working cylinder 2 via the annular space 17 between working cylinder 2 and reservoir tube 3 toward valve 7. Accordingly, the input side 18 of valve 7 is located such that it faces the reservoir tube 3. The valve slide 20 of valve 7 is preloaded in closing position via a spring 22 such that the bypass path 24 is closed. It is not until a predetermined volume flow is exceeded that the valve slide 20 moves in direction of the output side 26 so that the bypass path 24 is opened. The bypass path is an annular space around the valve slide which extends below the valve housing 28. Bypass path 24 overlaps bypass path 30 of valve 8 below the shared wall 32.

The check valve 34 prevents fluid from flowing into the bypass path on the input side 18 below the valve slide 20. This check valve 34 comprises a corrugated spring as preloading element and a sealing element. Accordingly, when flowing in push direction, the fluid can only flow through valve 7 or, insofar as valve 7 has moved into the open position because of an excessive volume flow, can enter the bypass path 24 on the input side of valve slide 20. On the other hand, the fluid does not pass through openings 36.

Provided that valve 7 is in the closed position or basic position as is shown in FIG. 1, all of the hydraulic fluid flows through valve 7 via the main flow path 38 toward the hydraulic unit 9 and arrives at valve 8 after passing the pump 10. If valve 8 is also traversed, penetration into bypass path 30 is impossible because the valve slide 20 of valve 8 is in the closed position.

After valve 7 opens, there is still a portion of the main flow path 38 that is open, i.e., a portion of the hydraulic fluid flows in the described manner. However, the excess volume of hydraulic fluid is moved via the bypass path 24 to openings 40 where the corrugated spring 42 does not prevent hydraulic fluid from exiting.

In this regard, component parts of valves 7 and 8 which correspond to one another and which are not to be differentiated for the description of the hydraulic paths are provided with the same reference numerals. Openings 36 and 40 and corrugated springs 34 and 42 have different reference numerals for easier differentiation.

The process is analogous in pull direction. The hydraulic fluid enters valve 8 or the valve slide 22 of valve 8 via the input side 44 of valve 8 and passes the valve so as to arrive again in the working chamber 2 via the hydraulic unit 9 and valve 7. In so doing, bypass path 30 is closed and hydraulic fluid is prevented from entering bypass path 30 via openings 40 by the corrugated spring. The valve 7 is also in the closing position so that no hydraulic fluid can reach the bypass path 24 in this case either.

When the volume flow of the hydraulic fluid exceeds a predetermined value, the valve 8 moves from the closed position shown in FIG. 1 into the open position, and the valve slide 20 moves toward the output side 46 of valve 8. Accordingly, a portion of the hydraulic fluid can arrive in the bypass path 30, pass through the latter and exit from the bypass path again via the openings 36. The exit through the openings 36 is not impeded by the corrugated spring 34. A further portion of hydraulic fluid is not prevented from continued flow and passes the hydraulic unit 9 and the valve 7 in the main flow path 38. The two fluid flows reunite again on the input side 18 of valve 7 which, of course, is the output side in pull direction.

For the push direction, the input side designated by reference numeral 44 is then, of course, the output side of valve 8 and the output side 46 is the input side.

In view of the fact that the bypass paths 24 and 30 lie outside of the tube elements of the vibration damper 1, i.e., outside of the working cylinder 2 and reservoir tube 3, the vibration damper 1 makes do with two tube elements. Through an overlapping of the bypass paths 24 and 30, moreover, the latter can be made extremely short.

Figure 2:
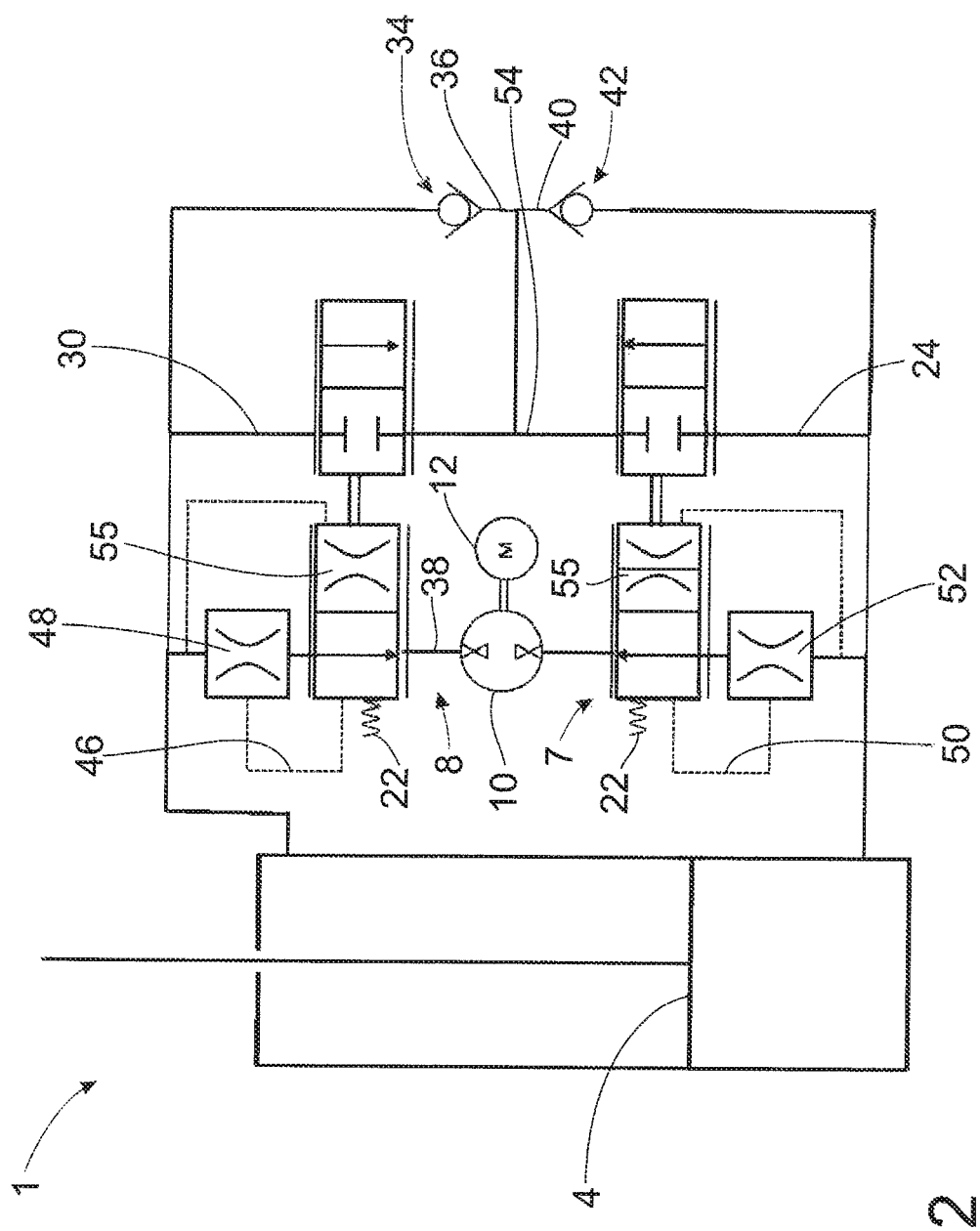
FIG. 2 is a hydraulic diagram of the vibration damper of FIG. 1.

FIG. 2 shows the hydraulic schematic of the vibration damper 1. The same reference numerals as in FIG. 1 designate identical component parts. Channels 46 and restriction 48 of valve 8 and channels 50 and restriction 52 of valve 7 are designated for the sake of clarity.

The exact functioning of valves 7 and 8 can be gathered from DE 10 2014 202 440 A1, the entire content of which is hereby incorporated herein by reference.

When a predetermined volume flow is exceeded, the valve slide 20 of valve 7 is moved from the open position, which is also represented hydraulically in FIG. 2, into the closed position. In this way, a restriction is likewise formed at the output side 26. Further, the bypass path 24 is opened.

It is advantageous in this respect that the bypass paths 24 and 30 overlap in a portion, namely, portion 54 as has been described. This is particularly clear from the hydraulic diagram in FIG. 2. Depending on the flow direction of the fluid, exit is possible via openings 36 or 40, and the corrugated springs 34 and 42, as check valves, only permit a flow direction through opening 36 or opening 40.

Figure 3:
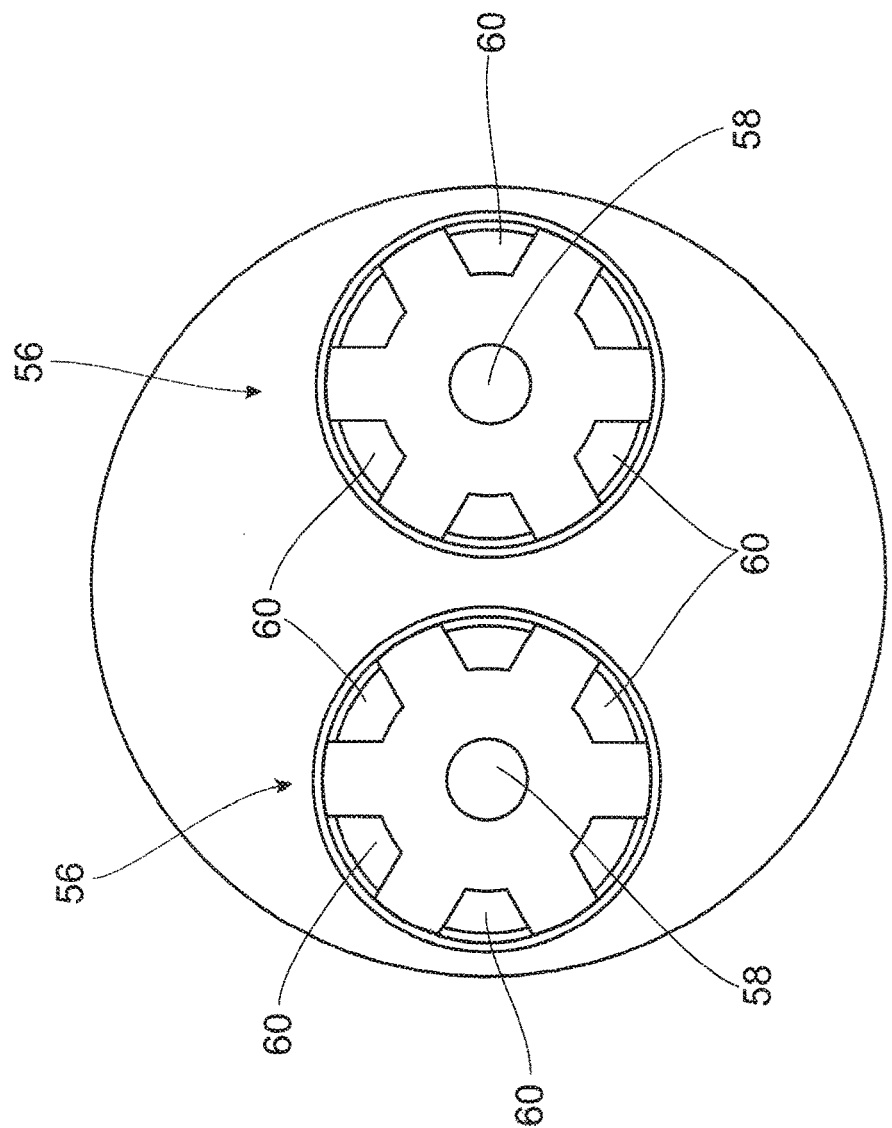
FIG. 3 is a sectional view along line I-I of FIG. 1.

FIG. 3 shows a possibility for realizing the second restrictions 56 in the main flow path 38.

FIG. 3 shows a section through plane I-I on the output sides 26 and 47 of valves 7 and 8. An annular plate 56 with an opening 58 situated in the center and openings 60 at the edge is located in each instance on the output sides 26 and 47 of valves 7 and 8. In the open position of valve 7 and valve 8, all of the openings 58 and 60 are connected to the main flow path 38; with flow through a valve 7 or 8 and in the closed position, only the middle opening 58 is connected to the main flow path 38, while the valve slide 20 disconnects the openings 60 from the main flow path 38. In this way, the flow resistance in the main flow path 38 is increased resulting in the restrictions 55.

Figure 4:
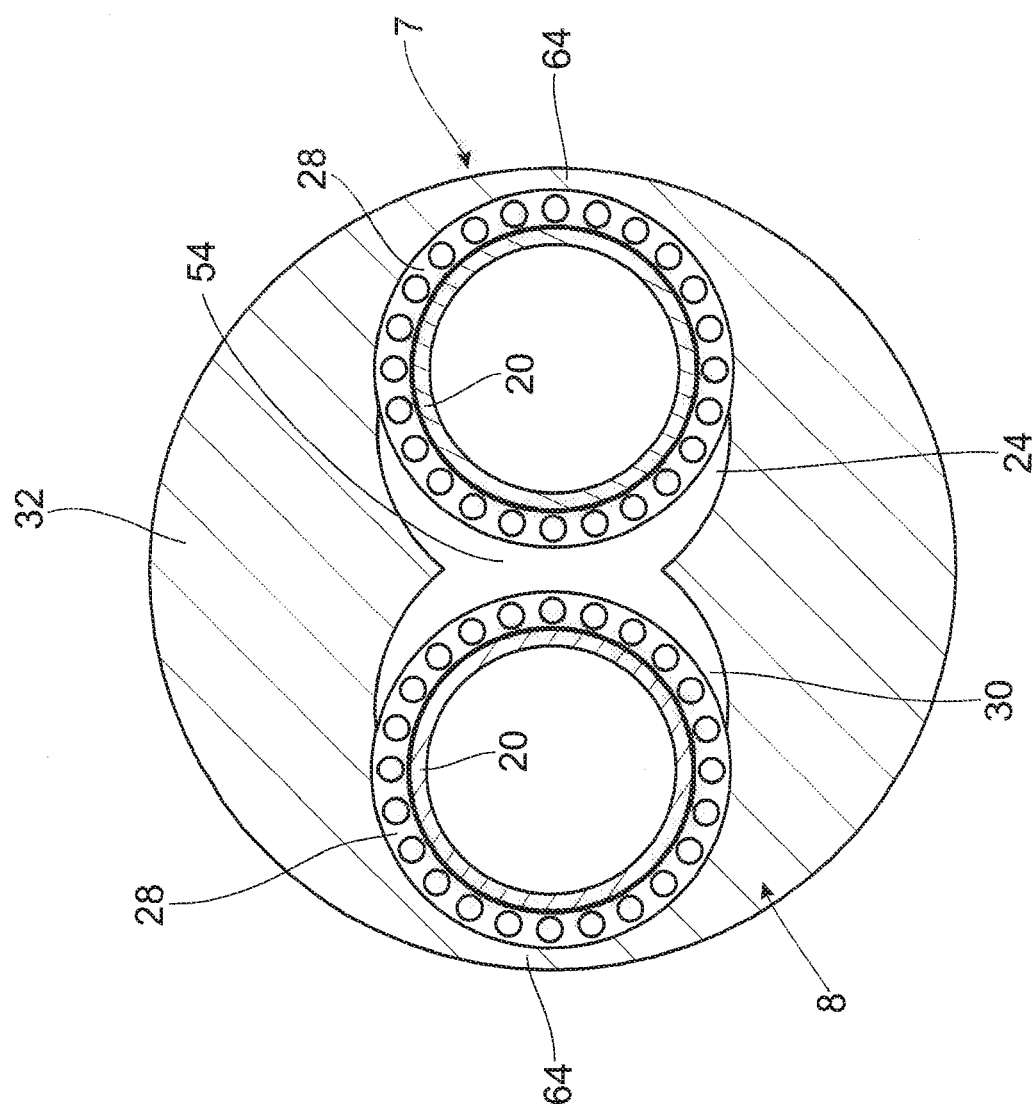
FIG. 4 is a sectional view along line II-II of FIG. 1.

FIG. 4 shows a section through plane II-II on the input sides 18 and 44 of valves 7 and 8. Following the outer housing 64 from the outside to the inside is the valve housing 28 in which the valve slide 20 is located. The bypass paths 24 or 30 are released via valve slide 20. Due to the fact that the bypass paths lead in each instance to the other valve, the largest portion of bypass paths 24 and 30 is common to both of the bypass paths 24 and 30 and is designated as common portion 54. As a result of the arrangement of bypass paths 24 and 30 between valves 7 and 8, the bypass path is short on the one hand and, on the other hand, is still used in common for the largest portions for the pull direction and push direction. Accordingly, installation space can be minimized.

The bypass path is an annular space around the valve slide which runs below the valve housing 28. Bypass path 24 overlaps bypass path 30 of valve 8 below the shared wall 32.

Figure 5:
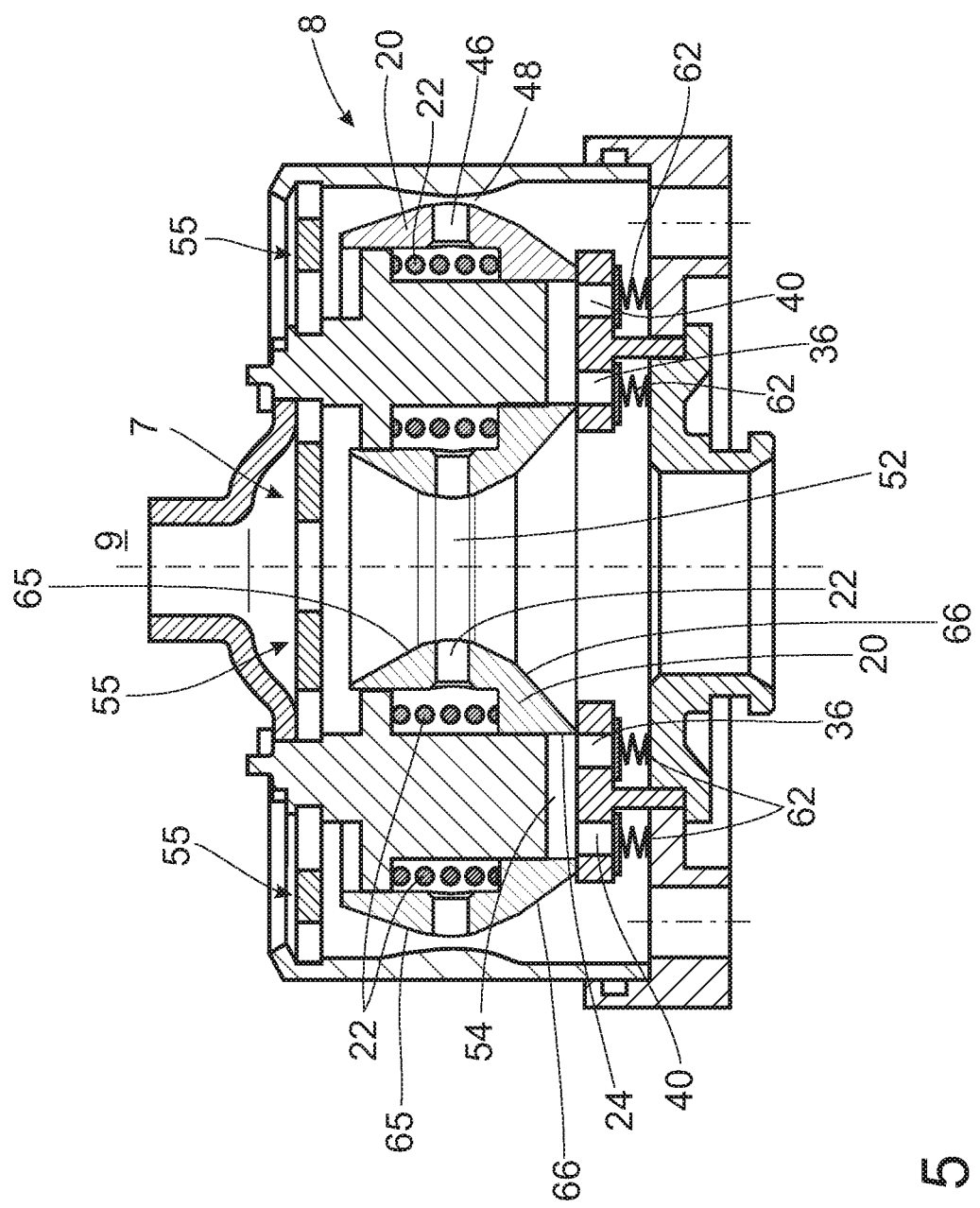
FIG. 5 is a cross-sectional view of a valve arrangement in a second configuration.

FIG. 5 shows an alternative configuration of a valve arrangement. The valves are nested annularly one inside the other, i.e., valve 7 is located inside valve 8. Here also, bypass paths 24 and 30 overlap again in portion 54. The fluid can escape either via opening 36 or opening 40 after passing through the respective bypass path. In this case, the check valves are constructed as preloaded valves 62 and not as corrugated springs. The function, i.e., the opening of bypass paths 24 and 30 and the closing of openings 36 and 40 via check valves 62, corresponds to the description referring to FIG. 1 in terms of function with respect to construction. The restrictions 55 are also provided in the described manner.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

REFERENCE CHARACTERS 1 vibration damper
2 working cylinder
3 reservoir tube
4 piston
5 piston rod
6 housing
7 valve
8 valve
9 hydraulic unit
10 pump
12 electric motor
14 base
16 piston rod guide
17 annular space
18 input side
20 valve slide
22 spring
24 bypass path
26 output side
28 valve housing
30 bypass path
32 wall
34 check valve
36 opening
38 main flow path
40 opening
42 check valve
44 input side
46 channel
47 output side
48 restriction
50 channel
52 restriction
54 portion
55 restriction
56 plate
58 opening
60 opening
62 check valve
64 housing

The invention claimed is:

1. A vibration damper (1) for a motor vehicle comprising:
tube elements (2, 3);
a hydraulic unit (9); and
two valves constructed (7, 8) for controlling a volume flow to the hydraulic unit (9) during one of a compression stroke and a rebound stroke; and wherein the two valves (7, 8) and the hydraulic unit (9) are arranged in series outside of the tube elements (2, 3) of the vibration damper (1) so that a fluid flow path proceeds through one of the two valves through the hydraulic unit and through the other of the two valves and vice versa; and
wherein each of the two valves comprises a bypass path which can be at least partially released through a respective valve (7, 8) and wherein a bypass path (24, 30) of one valve (8, 7) at least partially overlaps with the bypass path (30, 24) of the other valve (8, 7).

2. The vibration damper according to claim 1, wherein each valve (7, 8) comprises a valve housing (28) and a valve slide (20) which is movable in the valve housing (28) during one of the compression stroke and the rebound stroke for at least partially closing at least one flow path (24, 30, 38) of a fluid flowing through the valves (7, 8).

3. The vibration damper according to claim 2, wherein the valve slides (20) of each valve comprises pressure-impingement surface areas and wherein each of the valves (7, 8) has an input side (18, 44) and an output side (26, 47); the pressure-impingement surface areas (65, 66) of the valve slide (20) being substantially equally dimensioned for an opening pressure and a closing pressure; and the valve slide comprising a restriction (52) constructed for generating a pressure difference between an opening pressure and a closing pressure.

4. The vibration damper according to claim 3, additionally comprising at least one channel (50) extending through the valve slide and constructed for connecting an inside space of the valve slides (20) with an outside space of the valve slides (20).

5. The vibration damper according to claim 2, additionally comprising at least one channel (50) constructed for connecting an inside space of the valve slides (20) with an outside space of the valve slides (20).

6. The vibration damper according to claim 2, wherein the bypass path (24, 30) can be closed by the valve slide (20) and is fluidically connected as a flow path to an input side (18, 44) of the valves (7, 8).

7. The vibration damper according to claim 1, additionally comprising a housing (6) fastened to the vibration damper (1); and wherein the valves (7, 8) and the hydraulic unit (9) are arranged in the housing (6).

8. The vibration damper according to claim 7, wherein the hydraulic unit (9) is configured as a hydraulic pump.

9. The vibration damper according to claim 1, wherein the bypass paths (24, 30) comprise an output and a check valve (34, 42) at the output.

10. The vibration damper according to claim 9, wherein the check valve (34, 42) comprises a corrugated spring.

11. The vibration damper according to claim 1, wherein the hydraulic unit (9) is configured as a hydraulic pump.

12. The vibration damper according to claim 1, additionally comprising a main flow path (38) which can be at least partially closed by the valve slide (20) and is fluidically connected as a flow path to an output side (26, 47) of the valves (7, 8).

13. The vibration damper according to claim 1, wherein the two valves (7, 8) each have an input side (18, 44) and wherein the input sides (18, 44) of the valves (7, 8) both face toward a tube element (2, 3) of the vibration damper (1).

14. The vibration damper according to claim 1, wherein the vibration damper (1) comprises a working cylinder (2) and a reservoir tube (3) surrounding the working cylinder (2).

15. A motor vehicle comprising at least one vibration damper (1) constructed according to claim 1.

16. A vibration damper (1) for a motor vehicle comprising:
tube elements (2, 3);
a hydraulic unit (9); and
two valves constructed (7, 8) for controlling a volume flow to the hydraulic unit (9) during one of a compression stroke and a rebound stroke; and wherein the two valves (7, 8) and the hydraulic unit (9) are arranged in series outside of the tube elements (2, 3) of the vibration damper (1) so that a fluid flow path proceeds through one of the two valves through the hydraulic unit and through the other of the two valves and vice versa;

wherein each valve (7, 8) comprises a valve housing (28) and a valve slide (20) which is movable in the valve housing (28) during one of the compression stroke and the rebound stroke for at least partially closing at least one flow path (24, 30, 38) of a fluid flowing through the valves (7, 8); and wherein the valve slides (20) of each valve comprises pressure-impingement surface areas and wherein each of the valves (7, 8) has an input side (18, 44) and an output side (26, 47); the pressure-impingement surface areas (65, 66) of the valve slide (20) being substantially equally dimensioned for an opening pressure and a closing pressure; and the valve slide comprising a restriction (52) constructed for generating a pressure difference between an opening pressure and a closing pressure.

17. A vibration damper (1) for a motor vehicle comprising:
    tube elements (2, 3);
    a hydraulic unit (9); and
    two valves constructed (7, 8) for controlling a volume flow to the hydraulic unit (9) during one of a compression stroke and a rebound stroke; and wherein the two valves (7, 8) and the hydraulic unit (9) are arranged in series outside of the tube elements (2, 3) of the vibration damper (1) so that a fluid flow path proceeds through one of the two valves through the hydraulic unit and through the other of the two valves and vice versa;
    wherein each valve (7, 8) comprises a valve housing (28) and a valve slide (20) which is movable in the valve housing (28) during one of the compression stroke and the rebound stroke for at least partially closing at least one flow path (24, 30, 38) of a fluid flowing through the valves (7, 8); and
    additionally comprising a bypass path (24, 30) which can be closed by the valve slide (20) and is fluidically connected as a flow path to an input side (18, 44) of the valves (7, 8).

* * * * *